(12) United States Patent
Park (10) Patent No.: US 11,782,161 B2
(45) Date of Patent: Oct. 10, 2023

(54) TOF MODULE AND OBJECT RECOGNITION DEVICE USING TOF MODULE

(71) Applicant: LG INNOTEK CO., LTD., Seoul (KR)

(72) Inventor: Gwui Youn Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 643 days.

(21) Appl. No.: 16/631,518

(22) PCT Filed: Jul. 18, 2018

(86) PCT No.: PCT/KR2018/008124
§ 371 (c)(1),
(2) Date: Jan. 16, 2020

(87) PCT Pub. No.: WO2019/017692
PCT Pub. Date: Jan. 24, 2019

(65) Prior Publication Data
US 2020/0142071 A1 May 7, 2020

(30) Foreign Application Priority Data

Jul. 18, 2017 (KR) ........................ 10-2017-0090921

(51) Int. Cl.
*G01S 17/89* (2020.01)
*G01S 17/894* (2020.01)
(Continued)

(52) U.S. Cl.
CPC .......... *G01S 17/894* (2020.01); *G01S 7/4814* (2013.01); *G06V 10/141* (2022.01); *G06V 40/166* (2022.01); *G06V 40/172* (2022.01)

(58) Field of Classification Search
CPC .. G06V 40/172; G06V 40/166; G06V 10/141; G01S 7/4814; G01S 7/4802;
(Continued)

(56) References Cited

U.S. PATENT DOCUMENTS 10,677,922 B2 6/2020 Meinherz et al.
10,690,484 B2 6/2020 Lee et al.
(Continued)

FOREIGN PATENT DOCUMENTS

CN 104583804 A 4/2015
CN 104730532 A 6/2015
(Continued)

OTHER PUBLICATIONS

"Face Recognition using a Time-of-Flight Camera", Simon Meers & Koren Ward, pp. 377-382, 2009 Sixth International Conference on Computer Graphics, Imaging and Visualization.
(Continued)

*Primary Examiner* — Timothy R Newlin
(74) *Attorney, Agent, or Firm* — KED & Associates LLP (57) ABSTRACT

Disclosed are a ToF module and an object recognition device using the ToF module. The ToF module according to the present invention is a time of flight (ToF) module for measuring distance and depth information in a ToF manner, and comprises: a light transmitting unit for outputting light to an object; and a light receiving unit for receiving light reflected from the object, wherein the light transmitting unit comprises: a light source including a package of a plurality emitters; an emitter driving unit for selectively driving at least one emitter of the plurality of emitters; and a drive control unit for primarily controlling the driving of the plurality of emitters and, in accordance with the reflected light received by the light receiving unit, secondarily selecting at least one emitter of the plurality of emitters and controlling the driving thereof.

16 Claims, 4 Drawing Sheets

(51) Int. Cl.
*G01S 7/481* (2006.01)
*G06V 40/16* (2022.01)
*G06V 10/141* (2022.01)

(58) Field of Classification Search
CPC ...... G01S 7/4815; G01S 17/894; G01S 17/10; G01S 17/89; G02B 7/04; G03B 13/20; G03B 13/32
See application file for complete search history.

(56) References Cited

U.S. PATENT DOCUMENTS

| | | | |
|---|---|---|---|
| 10,713,804 B2 | 7/2020 | Wang et al. | |
| 11,172,838 B2 | 11/2021 | Park et al. | |
| 2007/0177860 A1* | 8/2007 | Hooley | G02B 7/08 396/79 |
| 2008/0237445 A1* | 10/2008 | Ikeno | G01S 17/32 250/205 |
| 2009/0167930 A1* | 7/2009 | Safaee-Rad | G03B 13/36 348/347 |
| 2011/0234450 A1* | 9/2011 | Sakai | G01S 17/42 342/70 |
| 2013/0148102 A1* | 6/2013 | Oggier | G01S 7/4915 356/5.01 |
| 2014/0049610 A1 | 2/2014 | Hudman et al. | |
| 2015/0168541 A1 | 6/2015 | Lee et al. | |
| 2015/0185325 A1* | 7/2015 | Park | G01S 17/931 356/5.01 |
| 2015/0373250 A1* | 12/2015 | Sfaradi | H04N 5/37457 348/345 |
| 2016/0037151 A1* | 2/2016 | Lin | H04N 13/271 348/46 |
| 2016/0128162 A1* | 5/2016 | Raynor | H05B 45/10 315/152 |
| 2016/0248975 A1* | 8/2016 | Choi | H04N 5/23293 |
| 2017/0132790 A1* | 5/2017 | Jeong | G06T 1/0007 |
| 2017/0249501 A1* | 8/2017 | Van der Sijde | G06V 20/64 |
| 2017/0343675 A1* | 11/2017 | Oggier | G01S 17/894 |
| 2018/0059225 A1* | 3/2018 | Zhu | G01S 17/894 |
| 2018/0063403 A1* | 3/2018 | Ryu | H04N 9/045 |
| 2018/0113212 A1* | 4/2018 | Tachibana | G01S 15/32 |
| 2018/0157155 A1* | 6/2018 | Gryshchenko | G03B 21/2033 |
| 2018/0224551 A1* | 8/2018 | Kiy | H05B 47/125 |
| 2021/0239815 A1* | 8/2021 | Acosta | G06T 15/00 |
| 2021/0258457 A1* | 8/2021 | Akkaya | G06T 7/11 |

FOREIGN PATENT DOCUMENTS

| | | |
|---|---|---|
| CN | 104748731 A | 7/2015 |
| CN | 10485663 A | 8/2015 |
| CN | 105572681 A | 5/2016 |
| CN | 105940675 A | 9/2016 |
| KR | 10-2011-0011244 | 2/2011 |
| KR | 10-2013-0100524 | 9/2013 |
| KR | 10-2014-0145481 | 12/2014 |
| KR | 10-2015-0076760 | 7/2015 |
| KR | 10-2015-0086479 | 7/2015 |
| KR | 10-1557295 | 10/2015 |
| WO | WO 2017/063435 A1 | 4/2017 |

OTHER PUBLICATIONS

Korean Office Action dated Nov. 29, 2021 issued in Application No. 10-2017-0090921.
International Search Report dated Oct. 26, 2018 issued in Application No. PCT/KR2018/008124.
Chinese Office Action dated Feb. 22, 2023 issued in Application 201880047935.1.
"Application of Time-of-Flight Camera for Relative Measurement of Non-Cooperative Target in Close Range;" Bin Liang et al.; Journal of Astronautics, vol. 37, No. 9, Sep. 2016 (English Abstract).

* cited by examiner

TOF MODULE AND OBJECT RECOGNITION DEVICE USING TOF MODULE

CROSS-REFERENCE TO RELATED PATENT APPLICATIONS

This application is a U.S. National Stage Application under 35 U.S.C. § 371 of PCT Application No. PCT/KR2018/008124, filed Jul. 18, 2018, which claims priority to Korean Patent Application No. 10-2017-0090921, filed Jul. 18, 2017, whose entire disclosures are hereby incorporated by reference.

TECHNICAL FIELD

The teachings in accordance with exemplary and non-limiting embodiments of this invention relate generally to a ToF module and an object recognition device using the ToF module, and more particularly, to a ToF module configured to measure distance and depth information of an object by adaptively employing an optimum power to size and position of the object, and an object recognition device using the ToF module.

BACKGROUND ART

Methods for acquiring distance and depth information of an object may include, but not limited to, a stereo (binocular stereo vision) method, a time of flight (TOF) method and a structured light method.

The stereo method is a method employing a stereo vision of two cameras to measure a depth and distance of a scene using the binocular depth detection algorithm. The stereo method however suffers from disadvantages in that many calculations are required to seek a distance to an object, resulting in slow speed in acquiring distance and depth information.

The structured light method is a method in which a structured light is projected on an object distinguishable from an ambient light such as visible laser or infrared laser in a structured pattern, a reflected light is acquired as a camera image to analyze distortion in response to a distance to the object and a distance is calculated. However, an image acquired from the structured light method is subject to ambient illuminations such as sunlight and brightness of fluorescent lamp, and therefore, a distance to and depth of an object obtained as a result of the structured light method is disadvantageously sensitive to illumination noises.

Meantime, the time of flight (TOF) method is a method in which waves such as electromagnetic radiation and ultrasonic waves are emitted to an object, and a round-trip time of reflected light is measured to acquire a distance and a depth of the object. At this time, a device measuring the distance and depth information based on the ToF generally projects uniform light to a particular angle of view by employing a surface light source.

However, when an object is small in size, the conventional ToF device (module) may project light even to an unnecessary area to disadvantageously result in generation of power loss.

DETAILED DESCRIPTION OF THE INVENTION

Technical Subject

The present invention is created to solve the aforementioned disadvantages and it is an object of the present invention to provide a ToF module configured to measure distance and depth information of an object by adaptively employing an optimum power to size and position of the object, and an object recognition device using the ToF module.

Technical Solution

In one general aspect of the present invention, there is provided a ToF (Time of Flight) module measuring distance and depth information in a ToF manner, the ToF module comprising: a light transmitter configured to output a light to an object; and a light receiver configured to receive a light reflected from the object, wherein the light transmitter comprises: a light source comprising a plurality of emitters; and a controller configured to control to drive of the plurality of emitters, and wherein the controller controls to drive at least one emitter among the plurality of emitters in response to the reflected light received by the light receiver.

The controller controls the plurality of emitters based on a size and position of the object in response to the reflected light received by the light receiver.

The controller analyze a distance and depth information of an object in response to a reflected light received by the light receiver in response to an output of the emitter controlled in response to the size and position of the object.

The controller, after controlling to drive the plurality of emitters at a first illumination, controls to drive an emitter corresponding to a size and position of the object among the plurality of emitters to a second illumination higher than the first illumination.

The controller decreases an intensity of illumination lower than the first illumination, or turns off an emitter not corresponding to the size and position of the object among the plurality of emitters.

In still another general aspect of the present invention, there is provided an object recognition device automatically recognizing an object, comprising: a ToF module configured to primarily analyze a size and position of an object within a predetermined scope, and secondarily analyze a distance and depth information of the object in response to the analyzed size and position of the object; and a focus setter configured to set a focus of at least one lens in mutually different modes in response to the primary analysis result or the secondary analysis result of the ToF module.

The focus setter sets a focus of the lens in a near mode or a far mode in response to the primary analysis result of the ToF module, and sets a focus of the lens in one of mode among a figure mode, a macro mode, and an object mode in response to the secondary analysis result of the ToF module.

The object recognition device further comprises an electronic circuit controller configured to control to turn on or turn off at least one electronic circuit in response to the primary analysis result of the ToF module, and control to lift up or lift down an intensity corresponding to the electronic circuit in response to the secondary analysis result of the ToF module.

The electronic circuit controller controls to turn on or turn off the electronic circuit, corresponding to at least one of a display and a speaker, in response to the primary analysis result of the ToF module, and controls to lift up or lift down at least one of a screen brightness and a volume in corresponding to the electronic circuit in response to the secondary analysis result of the ToF module.

The object recognition device further comprises a facial information storage configured to store a pre-set facial information of a user; and a security object determiner configured to detect a security object approaching within the predetermined scope in response to the primary analysis result of the ToF module, and determine a validity of the detected security object by comparing the secondary analysis result of the ToF module with the facial information.

Advantageous Effects

According to the present invention, power consumed in measuring distance and depth information of an object can be minimized by measuring the distance and the depth information adaptively using an optimum power to the size and position of the object.

Furthermore, an adaptive optimum autofocusing can be assisted/supported based on an object by applying a ToF module according to the present invention to a photographing device such as a camera.

Moreover, an optimum service can be assisted/supported in response to a distance and direction of a relevant user by applying a ToF module according to the present invention to smart devices such as smart phones and smart TV.

Still furthermore, determination of accurate validity to a user approaching within a predetermined scope can be assisted/supported even without manipulating, by a user, a separate security device, by applying a ToF module according to the present invention to a security device.

BEST MODE

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted while being explained in the exemplary embodiments of the present invention if obstructed in the understanding of the exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

Figure 1:
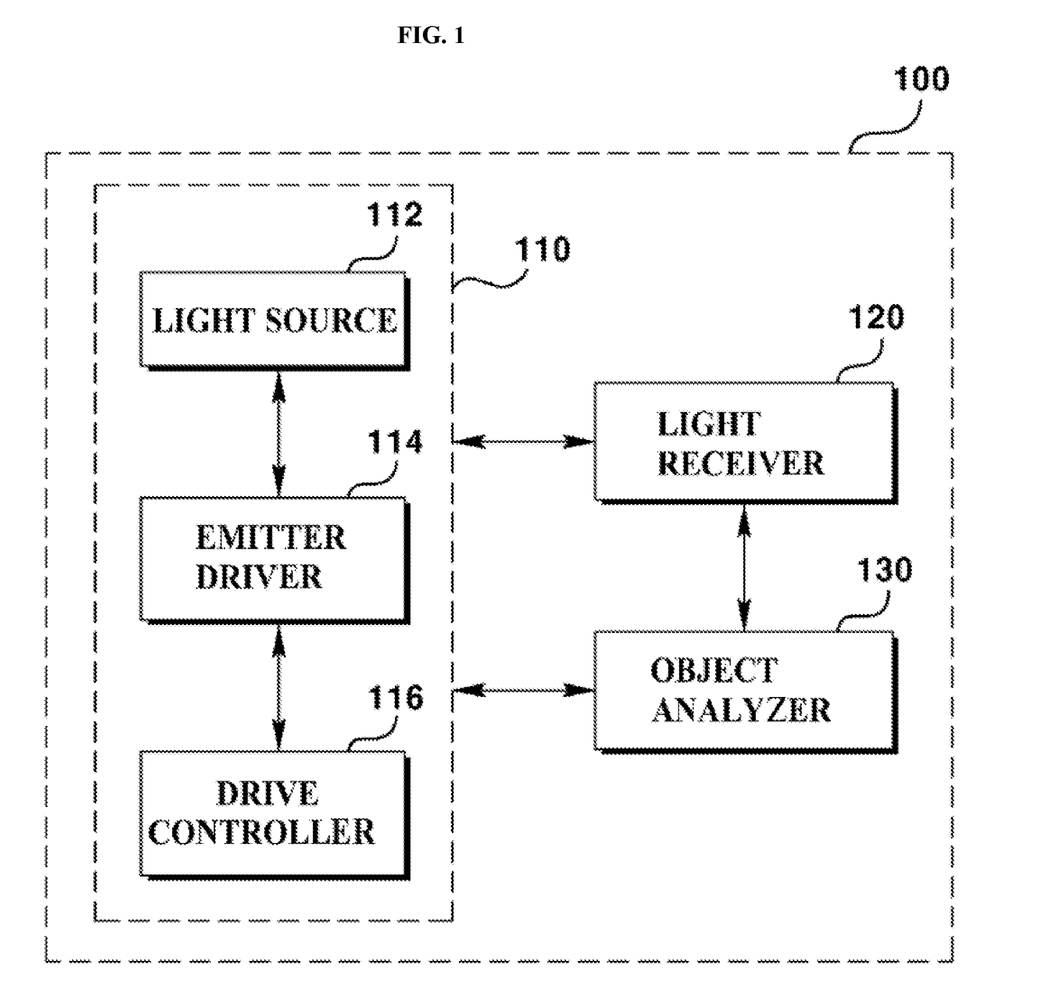
FIG. 1 is a schematic view illustrating a configuration of a ToF module according to an exemplary embodiment of the present invention.

FIG. 1 is a schematic view illustrating a configuration of a ToF module according to an exemplary embodiment of the present invention.

Referring to FIG. 1, a ToF module according to an exemplary embodiment of the present invention may include a light transmitter (110) outputting a light to an object and a light receiver (120) receiving the light reflected from the object. Here, the light transmitter (110) may include a light source (112), an emitter driver (114) and a drive controller (driving controller, 116).

Figure 2:
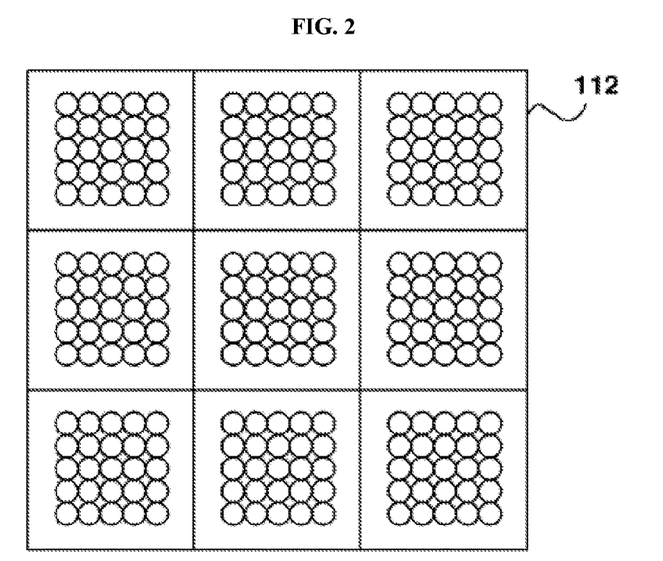
FIG. 2 is an illustration of an example of a light source being applied to the ToF module of FIG. 1.

The light source (112) may be embodied by a package of a plurality of emitters emitting a light. At this time, the light source (112) may be divided to a group of numbers setting the plurality of emitters, as shown in FIG. 2. For example, as illustrated in FIG. 2, the light source (112) may be divided in such a manner that 5×5 emitters are set as one group relative to a package of a plurality of emitters, and each emitter group is arranged in a 3×3 shape. However, the number of emitters within each group, arrangement shape, the number of emitter groups and arrangement shape are not limited to the shape illustrated in the figure, and may be variably changed in response to the number of emitters within a package and the arrangement shape of emitters.

Furthermore, the light source (112) may be embodied by combination of packages in plural number including a plurality of emitters. For example, as shown in FIG. 2, the light source (112) may be also embodied by a package including 5×5 emitters in a 3×3 arrangement shape. The said light source may be embodied by using an LED (Light Emitting Diode), an EEL (Edge Emitting Laser) and a VCSEL (Vertical-Cavity Surface Emitting Laser).

An emitter driver (114) may selectively drive at least one of a plurality of emitters in the light source (112). For example, when the light source (112) is embodied by a package of 5×5 emitters, the emitter driver (114) may selectively drive each emitter. At this time, when a plurality of emitters in the light source (112) is divided by group, or packages including a plurality of emitters are embodied in a combined shape, it is preferable that the emitter driver (114) is driven for each group or for each package relative to a plurality of emitters. At this time, the emitter driver (114) can turn on/off at least one of the plurality of emitters, and when illumination of each emitter is divided by a plurality of steps, the illumination of each emitter may be driven by a set step.

The driving controller (116) may primarily and controllably drive a plurality of emitters in the light source (112), and may secondarily and controllably drive by selecting at least one emitter from the plurality of emitters in response to the reflected light received by the light receiver (120). That is, the driving controller (116) may primarily and controllably drive all the emitters included in the light source (112), and may secondarily and controllably drive by selecting an emitter corresponding to an object in the plurality of emitters in response to the reflected light received by the light receiver (120). At this time, when the driving controller (116) primarily and controllably drives a plurality of emitters, it is preferable that the driving control be implemented with such a minimum (intensity of) illumination as to recognize the size and position of the object. Furthermore, when the driving controller (116) secondarily and controllably drives by selecting at least one emitter from a plurality of emitters, it is preferable that the driving control be implemented to controllably drive the selected emitter with a maximum illumination so that maximum distance and depth information of an object can be obtained.

Meantime, the ToF module (100) according to an exemplary embodiment of the present invention may further include an object analyzer (130).

The object analyzer (130) may analyze the size and position of an object based on a reflected light received by the light receiver (120) in response to the primary driving of a plurality of emitters, wherein the driving controller (116) may secondarily drive by selecting at least one emitter corresponding to the size and position of the object analyzed by the object analyzer (130) among the plurality of emitters in the light source (112). Furthermore, the object analyzer (130) may analyze distance and depth information of the object (10) based on the reflected light received by the light receiver (120) in response to the secondary driving control of the driving controller (116).

Figure 3:
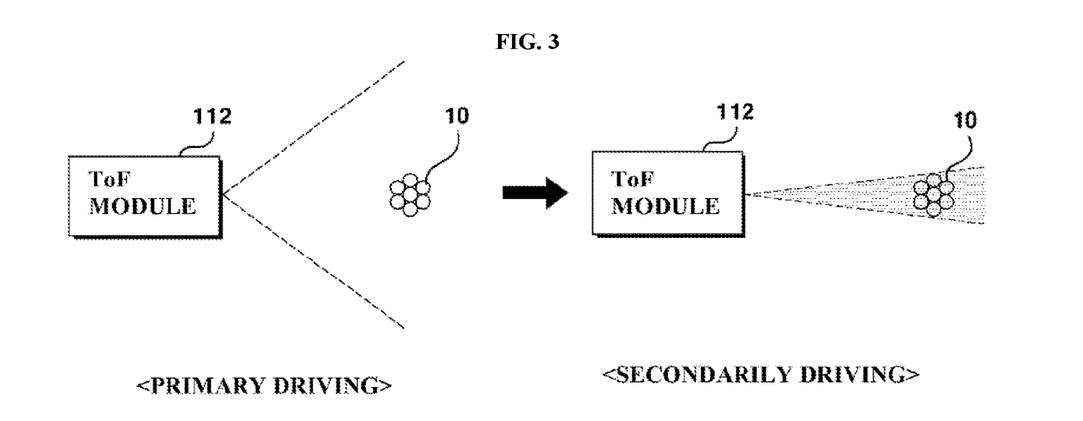
FIGS. 3 and 4 are schematic views illustrating to explain a process of a ToF module measuring distance information and position information of an object shown in FIG. 1.
Figure 4:
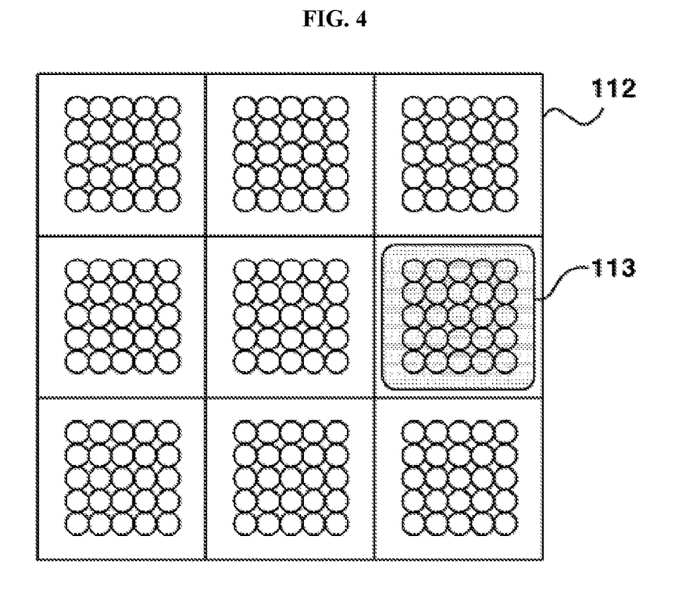

For example, when the light source (112) of the ToF module (100) outputs a light toward the object (10) as shown in FIG. 3, the light receiver (120) may receive the light reflected from the object (10), where, the object analyzer (130) may analyze the size and position of the object (10) by estimating the size and position of the object (10) in response to the position of the light received by the light receiver (120). Moreover, the driving controller (116) may estimate an emitter corresponding to the size and position of the object (10) analyzed by the object analyzer (130) among the plurality of emitters in the light source (112) as illustrated in FIG. 4, and as a result, may secondarily and controllably drive an emitter by selecting the estimated emitter (113) among the plurality of emitters. At this time, the driving controller (116) may controllably drive each emitter at a maximum illumination drivable by the selected emitter (113), and the object analyzer (130) may analyze the distance and depth information of an object (10) based on the reflected light received by the light receiver (120) in response to the secondary controllable drive of the driving controller (116). The method analyzing the size and position of object by the object analyzer (130) and the method analyzing the distance information and depth information of an object are prior art, the detailed explanation of which will be omitted hereinafter.

Furthermore, a controller (not shown) may control the drive of a plurality of emitters, or may drive at least one emitter among a plurality of emitters in response to a reflected light received by the light receiver (120). The controller (not shown) may perform all or some portions of functions performed by the emitter driver (114), the driving controller (116) and the object analyzer (130). For example, the controller may include the emitter driver (114), the driving controller (116) and the object analyzer (130).

In addition, the controller may control a plurality of emitters in response to the size and position of an object based on a reflected light received by the light receiver (120), and may analyze the distance and the depth information of the object (10) based on the reflected light received by the light receiver (120) in response to an output of emitter controlled in response to the size and position of the object (10).

The controller may controllably drive an emitter corresponding to the size and position of the object (10) in the plurality of emitters at a second illumination higher than a first illumination after controllably driving the plurality of emitters at the first illumination, and may reduce an illumination of an emitter not corresponding to the size and position of an object (10) among the plurality of emitters to an illumination lower than the first illumination, or may turn off the illumination.

Figure 5:
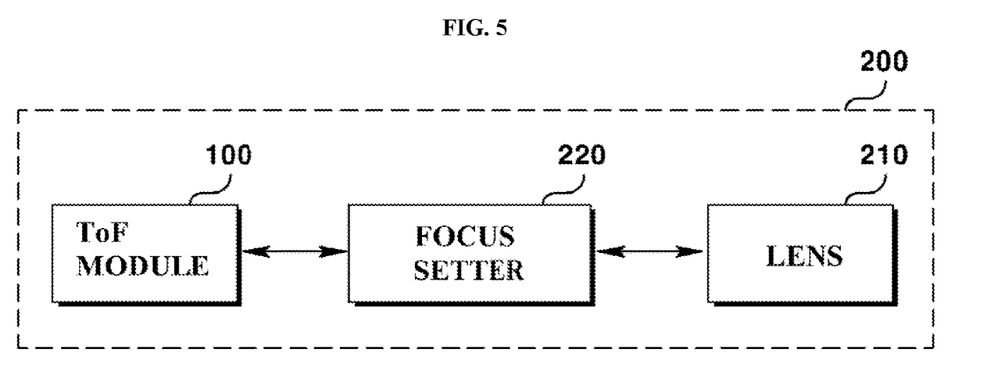
FIG. 5 is a schematic view illustrating a configuration of object recognition device according to an exemplary embodiment of the present invention.

FIG. 5 is a schematic view illustrating a configuration of object recognition device (200) according to an exemplary embodiment of the present invention. Here, the object recognition device (200) may be realized by a device such as a camera that requires an automatic recognition of an object.

Referring to FIG. 5, the object recognition device (200) may include a ToF module (100), a lens (210) and a focus setter (220).

The ToF module (100) may analyze the size and position of an object within a predetermined set scope by primarily emitting a light, and analyze the distance and the depth information of a relevant object by secondarily emitting a light in response to the analyzed size and position of the object. At this time, the ToF module (100) may apply the ToF module (100) illustrated in FIG. 1, and therefore, like reference numerals were applied.

The lens (210) may collect or disperse a light to allow capturing an optical image for photographing an object and may be embodied in various shape.

The focus setter (220) may set a focus of at least one lens (210) at mutually different modes in response to a primary or secondary analysis result of the ToF module (100). For example, when size and position of an object within a predetermined set scope are not analyzed while the ToF module (100) primarily outputs a light, the focus setter (220) may determine that a photographing object is not existent within a relevant setting scope and may automatically set a focus of a lens (210) at a distant mode.

Furthermore, when the size and position of an object within a predetermined scope are analyzed by the ToF module (100), the focus setter (220) may determine that a photographing object exists within a relevant setting scope, and may automatically set the focus of the lens (210) at a short distance mode.

Moreover, when the size and position of an object within a predetermined set scope are primarily analyzed by the ToF module (100), and when the distance and the depth information of a relevant object are secondarily analyzed by the ToF module (100), the focus setter (220) may recognize a person and an object based on the distance and the depth information secondarily analyzed by the ToF module (100), and thereupon, automatically set a focus of a lens (210) using any one mode of figure mode, a macro mode and an object mode. As a result, the object recognition device applied with the ToF module according to the present invention may adaptively implement an optimum auto focusing of an object.

Figure 6:
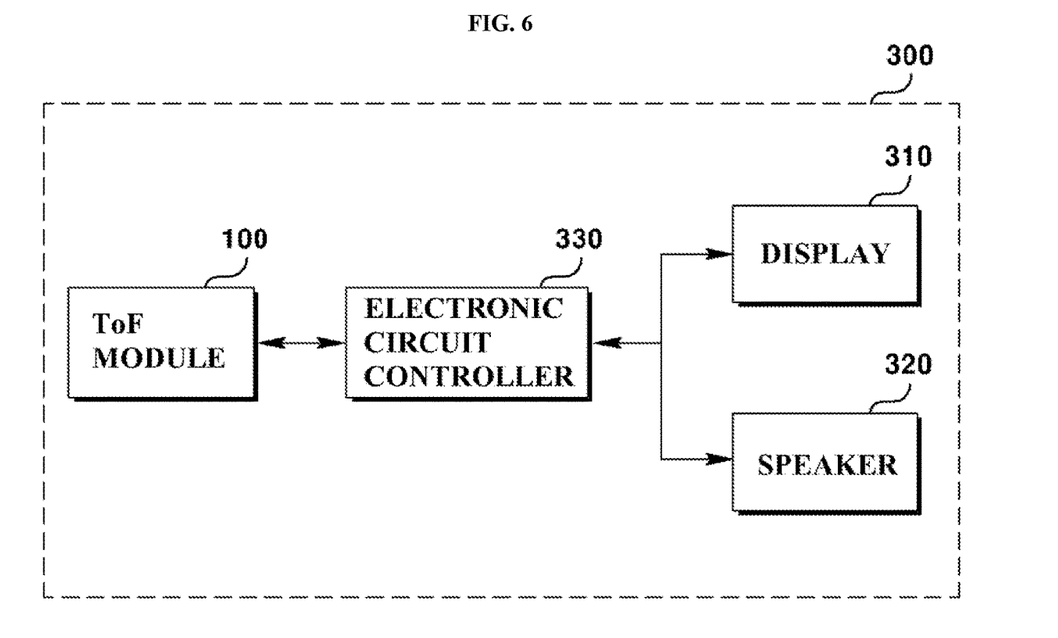
FIG. 6 is a schematic view illustrating a configuration of object recognition device according to another exemplary embodiment of the present invention.

FIG. 6 is a schematic view illustrating a configuration of object recognition device according to another exemplary embodiment of the present invention. Here, the object recognition device (300) may be applied to smart devices such as smart phones and smart TVs.

Referring to FIG. 6, the object recognition device (300) may include a ToF module (100), a display (310), a speaker (320) and an electronic circuit controller (330).

The ToF module (100) may analyze the size and position of an object within a predetermined set scope by primarily emitting a light, and analyze the distance and the depth information of a relevant object by secondarily emitting a light in response to the analyzed size and position of the object. At this time, the ToF module (100) may apply the ToF module (100) illustrated in FIG. 1, and therefore, like reference numerals were applied.

The display (310) and the speaker (320) are devices that output an image, a video and sound which can be viewed or listened to by a user, and detailed explanation thereto will be omitted hereinfrom.

The electronic circuit controller (330) may controllably turn on or turn off an electronic circuit corresponding to at least any one of the display (310) and the speaker (320) in response to the primary analysis result by the ToF module (100). That is, when it is analyzed by the ToF module (100) that a user has approached within a predetermined set scope, the electronic circuit controller (330) may automatically convert at least any one of the power-saving moded display (310) and the speaker (320) to an operation mode. Moreover, when it is determined by the ToF module (100) that the scope is deviated from the predetermined set scope set by the user, the electronic circuit controller (330) may automatically convert at least any one of the operating display (310) and the speaker (320) to a power saving mode.

Furthermore, when it is primarily analyzed by the ToF module (100) that the user is within a predetermined set scope, and the distance and the depth information of a relevant user is secondarily analyzed, the electronic circuit controller (330) may automatically and controllably increase or decrease the screen brightness and volume of at least one of the display (310) and the speaker (320) in response to the analyzed result of distance and depth information.

That is, the electronic circuit controller (330) can automatically adjust the screen brightness and volume by determining a distance and direction of a relevant user in response to the secondary analysis result of the ToF module (100), even if the user is determined to be within a predetermined set scope by the primary analysis of the ToF module (100). Here, although it is illustrated and explained that the display and the speaker are automatically controlled in order to help understand the present invention, it should be apparent that the device automatically controlled by the electronic circuit controller (330) is not limited thereto, and various other electronic circuits may be controlled. As a result, the object recognition device applied with the ToF module according to the present invention can provide the determination of a user' approaches, and can also provide an optimum service in response to distance and direction of a relevant user.

Figure 7:
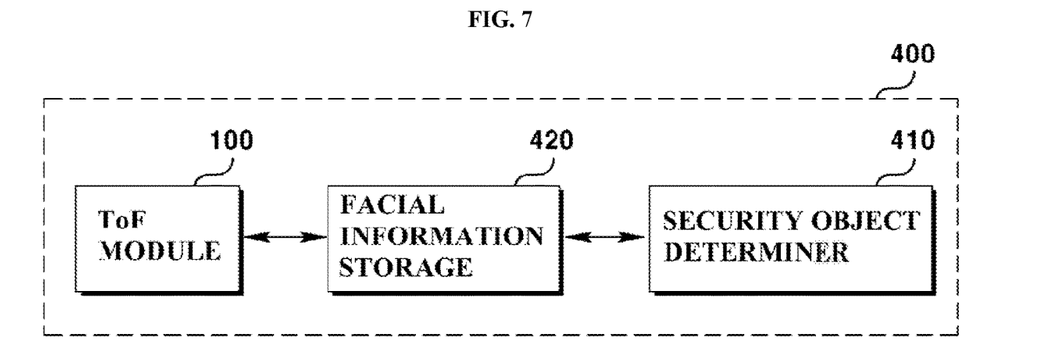
FIG. 7 is a schematic view illustrating an object recognition device according to still another exemplary embodiment of the present invention.

FIG. 7 is a schematic view illustrating an object recognition device (400) according to still another exemplary embodiment of the present invention. Here, the object recognition device (400) may be applied to security devices that require approaches and recognition of a security object.

Referring to FIG. 7, the object recognition device (400) may include a ToF module (100), facial information storage (410) and a security object determiner (420).

The ToF module (100) may analyze the size and position of an object within a predetermined set scope by primarily emitting a light, and analyze the distance and the depth information of a relevant object by secondarily emitting a light in response to the analyzed size and position of the object. At this time, the ToF module (100) may apply the ToF module (100) illustrated in FIG. 1, and therefore, like reference numerals were applied.

The facial information storage (410) may store pre-set facial information of a user. At this time the facial information may include depth information of a user's face.

The security object determiner (420) may detect a security object that approaches within a predetermined scope set in response to a primary analysis result by the ToF module (100), and compare the secondary analysis result by the ToF module (100) with the facial information stored in the facial information storage (410). At this time, the security object determiner (420) can determine whether a user approaching within the predetermined set scope is a pre-set lawful proper user by comparing the depth information analyzed by the ToF module (100) with the facial information stored in the facial information storage (410).

Hence, the object recognition device applied with a ToF module according to the present invention can accurately determine the lawfulness of a user approaching within a predetermined set scope even if a user does not separately manipulate a security device.

Although the foregoing discussion has explained exemplary embodiments disclosed by the present invention, the present invention is simply exemplary and not to limit the technical ideas thereof, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A ToF (Time of Flight) module, the ToF module comprising:
   a light transmitter configured to output a light to an object; and
   a light receiver configured to receive a light reflected from the object,
   wherein the light transmitter comprises:
      a light source comprising a plurality of emitters; and
      a controller configured to:
         control driving of the plurality of emitters at a first illumination, and primarily analyze a size and position of an object within a predetermined scope, and
         in response to the analyzed size and position of the object, select an emitter, corresponding to the size and position of the object, from among the plurality of emitters, control driving of the selected emitter at a second illumination higher than the first illumination, turn off the plurality of emitters other than the selected emitter, and secondarily analyze a distance and depth information of the object based on the light reflected from the object and received by the light receiver in response to the driving of the selected emitter while the plurality of emitters other than the selected emitter are turned off.

2. The ToF module of claim 1, wherein the controller controls the plurality of emitters based on the size and position of the object in response to reflected light received by the light receiver.

3. The ToF module of claim 1, wherein the controller analyze the distance and depth information of the object in response to the reflected light received by the light receiver in response to an output of the selected emitter controlled in response to the size and position of the object.

4. The ToF module of claim 1, wherein the controller turns off an emitter not corresponding to the size and position of the object among the plurality of emitters.

5. The ToF module of claim 1, comprising:
   an object analyzer configured to analyze a size and position of the object based on the reflected light received by the light receiver.

6. An object recognition device, comprising:
   a Time of Flight (ToF) module configured to primarily analyze a size and position of an object within a predetermined scope, and secondarily analyze a distance and depth information of the object in response to the analyzed size and position of the object; and a focus setter configured to set a focus of at least one lens in mutually different modes in response to the primary analysis result or the secondary analysis result of the ToF module, wherein the ToF module comprises:
- a light transmitter configured to output a light to the object; and
- a light receiver configured to receive a light reflected from the object, wherein the light transmitter comprises:
- a light source comprising a plurality of emitters; and
- a controller configured to:
  - control driving of the plurality of emitters at a first illumination, and primarily analyze a size and position of the object within a predetermined scope, and
  - select an emitter, corresponding to the size and position of the object, among the plurality of emitters, control driving of the selected emitter at a second illumination higher than the first illumination, turn off the plurality of emitters other than the selected emitter, and secondarily analyze a distance and depth information of the object based on the light reflected from the object and received by the light receiver in response to the driving of the selected emitter while the plurality of emitters other than the selected emitter are turned off.

7. The object recognition device of claim 6, wherein the focus setter sets a focus of the lens in a near mode or a far mode in response to the primary analysis result of the ToF module, and the focus setter sets a focus of the lens in one of mode among a figure mode, a macro mode, and an object mode in response to the secondary analysis result of the ToF module.

8. The object recognition device of claim 6, comprising:
an electronic circuit controller configured to control to turn on or turn off at least one electronic circuit in response to the primary analysis result of the ToF module, and to control to lift up or lift down an intensity corresponding to the electronic circuit in response to the secondary analysis result of the ToF module.

9. The object recognition device of claim 8, wherein the electronic circuit controller controls to turn on or turn off the at least one electronic circuit, corresponding to at least one of a display and a speaker, in response to the primary analysis result of the ToF module.

10. The object recognition device of claim 8, wherein the electronic circuit controller controls to lift up or lift down at least one of a screen brightness and a volume corresponding to the at least one electronic circuit in response to the secondary analysis result of the ToF module.

11. The object recognition device of claim 6, comprising:
- a facial information storage configured to store a pre-set facial information of a user; and
- a security object determiner configured to detect a security object approaching within the predetermined scope in response to the primary analysis result of the ToF module.

12. The object recognition device of claim 11, wherein the security object determiner is configured to determine a validity of the detected security object by comparing the secondary analysis result of the ToF module with the facial information.

13. A ToF (Time of Flight) module, the ToF module comprising:
a light transmitter configured to output a light to an object; and
a light receiver configured to receive a light reflected from the object, wherein the light transmitter comprises:
- a light source comprising a plurality of emitter packages; and
- a controller configured to:
  - control driving of the plurality of emitter packages at a first illumination, and primarily analyze a size and position of an object within a predetermined scope, and
  - select an emitter package, corresponding to the size and position of the object, among the plurality of emitter packages, control driving of the selected emitter package at a second illumination higher than the first illumination, turn off the plurality of emitter packages other than the selected emitter package, and secondarily analyze a distance and depth information of the object based on the light reflected from the object and received by the light receiver in response to the driving of the selected emitter package while the plurality of emitter packages other than the selected emitter package are turned off.

14. The ToF module of claim 13, wherein each of the plurality of emitter packages comprises a plurality of emitters.

15. The ToF module of claim 13, wherein each of the plurality of emitter packages is a group of a plurality of emitters arranged in an N×M shape.

16. The ToF module of claim 13, wherein the controller analyze a distance and depth information of an object in response to a reflected light received by the light receiver.

* * * * *